United States Patent
Sato et al.

(10) Patent No.: US 8,838,264 B2
(45) Date of Patent: Sep. 16, 2014

(54) MOLD DESIGNING APPARATUS, MOLD DESIGNING METHOD, MOLD DESIGNING SYSTEM AND MOLD DESIGNING PROGRAM

(75) Inventors: Koichi Sato, Tochigi (JP); Takeshi Tajima, Tochigi (JP); Toshio Tanahashi, Tochigi (JP); Nobuo Abe, Tochigi (JP)

(73) Assignee: Honda Motor Co., Ltd., Tokyo (JP)

(*) Notice: Subject to any disclaimer, the term of this patent is extended or adjusted under 35 U.S.C. 154(b) by 317 days.

(21) Appl. No.: 13/236,234

(22) Filed: Sep. 19, 2011

(65) Prior Publication Data
US 2012/0101616 A1   Apr. 26, 2012

(30) Foreign Application Priority Data
Oct. 25, 2010   (JP) ............... P.2010-238540

(51) Int. Cl.
*G06F 17/50* (2006.01)
*B29C 33/38* (2006.01)
*B29C 45/76* (2006.01)

(52) U.S. Cl.
CPC ......... *B29C 33/3835* (2013.01); *B29C 45/7693* (2013.01)
USPC ........................................... 700/146; 700/98

(58) Field of Classification Search
USPC .............................. 700/98, 203, 204
See application file for complete search history.

(56) References Cited

U.S. PATENT DOCUMENTS

| 8,355,894 B2 * | 1/2013 | Wang et al. ................ 703/1 |
| 2010/0076590 A1 * | 3/2010 | Taylor et al. .............. 700/206 |
| 2012/0059637 A1 * | 3/2012 | Yu ................................ 703/6 |

FOREIGN PATENT DOCUMENTS

JP    7-236942 A    9/1995

* cited by examiner

*Primary Examiner* — Sean Shechtman
(74) *Attorney, Agent, or Firm* — Squire Patton Boggs (US) LLP (57) ABSTRACT

A mold is designed by calculating a distribution of a contact surface pressure of a mating surface of a mold under a casting condition, and setting a machining amount of the mating surface of the mold based on the calculated distribution of the contact surface pressure.

7 Claims, 6 Drawing Sheets

- 204MPa (100%)
- 110MPa (54%)
- 151MPa (74%)

FIG.6

REVERSE RATE 100% AREA

REVERSE RATE 74% AREA    REVERSE RATE 54% AREA

MOLD DESIGNING APPARATUS, MOLD DESIGNING METHOD, MOLD DESIGNING SYSTEM AND MOLD DESIGNING PROGRAM

BACKGROUND OF THE INVENTION

1. Field of the Invention

The present invention relates to a technology for effectively preventing an occurrence of burrs in a casting.

2. Related Art

Relating to a casting technology, for example, Patent Reference 1 discloses a technology for designing a mold, in which a deformation amount of a product when a temperature of the product becomes a room temperature is calculated through analysis taking a temperature distribution of a mold and a temperature distribution of a product into consideration, and the mold is designed by taking the deformation amount into consideration.

[Patent Reference 1] JP-A-H07-236942

In some cases, there is seen a phenomenon in which burrs are generated in a casting.

Firstly, in a casting operation, molds are respectively expanded due to heat which is applied from a molten bath. This expansion is not uniform. Specifically, the expansion is caused to vary due to differences between shapes of respective portions of the molds, due to differences between pressures applied from the molten bath, due to differences between a mold fastening pressure of a molding machine, due to differences between amounts of heat applied from the molten bath, and the like. Owing to a partially different expansion, contact surface pressures to be applied to the mating surface of the molds cannot be uniform. As a result, in the casting operation, such portions of the mating surface of the molds as have relatively small contact pressures are opened, whereby the molten bath leaks out from such opened portions, resulting in a generation of burrs.

When such burrs are generated in the casting, there is necessary an operation of removing the burrs in a later process.

This addition of the burr removing operation leads to an increased cost of the casting. Also, in some cases, the burrs can stick to the molds. In this case, the molds cannot be properly fastened in a next casting process, which leads to further generation of burrs. When the burrs stick to the molds, there is necessary an operation to remove them. During a time for removing the burrs, the casting operation cannot be carried out. Further, since, during this time, the molds become cool, it is necessary to carry out a warming-up waste molding step again, which deteriorates a productivity of the product.

SUMMARY OF THE INVENTION

One or more embodiments of the invention provide a technology which can prevent a generation of burrs caused by a deformation of a mold.

In accordance with one or more embodiments of the invention, a mold is designed by calculating a distribution of a contact surface pressure of a mating surface of a mold under a casting condition, and setting a machining amount of the mating surface of the mold based on the calculated distribution of the contact surface pressure.

BRIEF DESCRIPTION OF THE DRAWINGS

FIG. 2 (A) to FIG. 2(G) are conceptual views of principles of generation of burrs and principles of prevention of such burrs generation.

DETAILED DESCRIPTION OF THE EXEMPLARY EMBODIMENT

Description will be given hereinbelow on the basis of an exemplary embodiment with reference to the drawings. Further, the exemplary embodiment are not intended to limit the invention but to serve as an example thereof, and all features or combinations thereof described in the exemplary embodiment are not always essential to the invention.

(Casting Apparatus)

Firstly, description will be given below of an example of a casting apparatus using molds of the exemplary embodiment.

Figure 1:
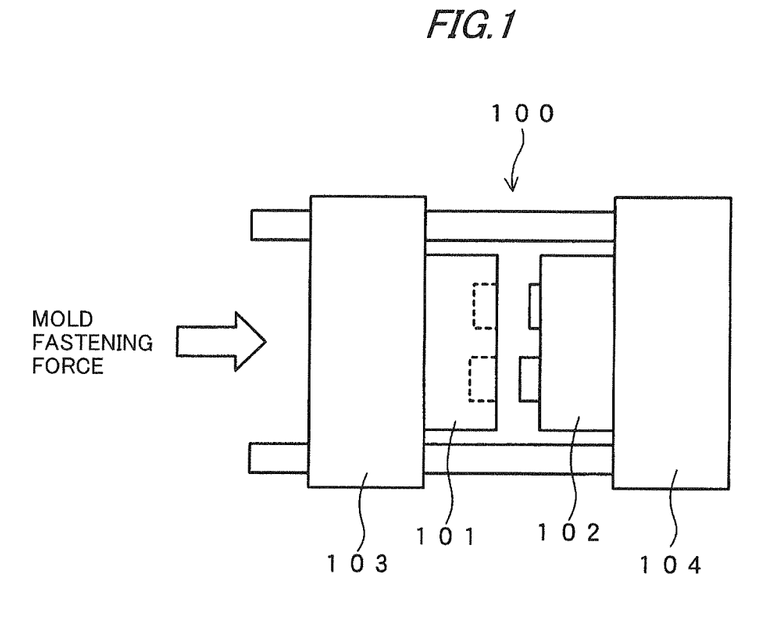
FIG. 1 is a conceptual view of a casting apparatus.

FIG. 1 shows a casting apparatus 100 using molds of the exemplary embodiment. FIG. 1 shows a state in which a set of molds 101 and 102 are mounted on the casting apparatus 100. The casting apparatus 100 includes a movable portion 103 for holding one mold and a fixed portion 104 for holding the other. When the movable portion 103 approaches the fixed portion 104, the molds 101 and 102 are contacted with each other and then are fixed in such contacted state. In this case, it is assumed that the two molds 101 and 102 are pressed against each other by a mold fastening force of a previously set value. Here, in the mold 101 or 102, there is formed a bath charging portion from which, in a state where the two molds 101 and 102 are contacted together, a molten bath can be charged into a cavity formed within the mold.

(Principles)

Now, description will be given below of a principle that burrs are generated and a principle that can prevent the generation of burrs. In the casting apparatus 100 shown in FIG. 1, in a state where the two molds 101 and 102 are contacted and combined together, a molten bath is charged into the cavity for casting. FIG. 2 is a conceptual view of the states of the PL surfaces (parting line surfaces) of the molds 101 and 102. The PL surfaces are the surfaces of two molds to be paired on which they are contacted with each other. And, the PL surface is such surface portion of one mold as exists in the periphery of a recessed portion or a projecting portion constituting the cavity on which one mold can be contacted with its mating mold. In the case that the contact state of the PL surfaces of the two molds to be paired is poor to generate a clearance between them, the molten bath leaks from (or penetrates into) the clearance, thereby causing burrs to be generated.

In the casting process, the molds 101 and 102 are expanded due to the heat of the molten bath. While the molds 101 and 102 are pressed against each other due to the mold fastening force, the PL surfaces are raised due to such expansion. In this case, there are generated clearances 105 and 106 between them. This state is shown exaggeratedly in FIG. 2(A). In FIG. 2 (A), there are shown the original PL surface 101a of the mold 101, a PL surface 101b expanded due to the above expansion, the original PL surface 102a of the mold 102 and a PL surface 102b expanded due to the above expansion. In the case that the molten bath leaks out into clearances 105 and 106, there are generated burrs on the PL surfaces.

In view of this, according to a burrs reducing method of the exemplary embodiment, by carrying out the following processings, the generation of burrs possibly caused by the above reason can be prevented. Now, description will be given simply of the basic principle of this method with reference to the PL surface of the mold 101. Firstly, according to computer simulation using a heat analysis model, the expansion of the PL surface of the mold 101 is estimated through calculation.

Figure 2A:
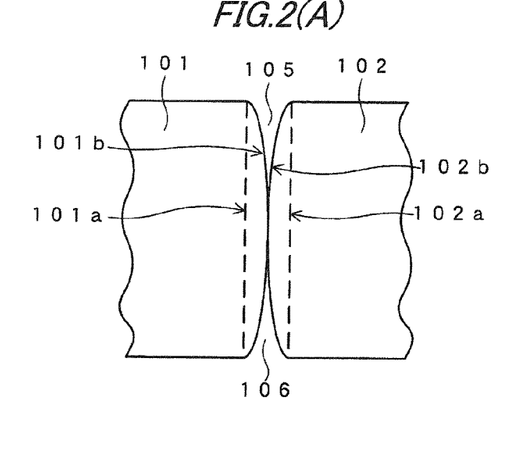
Figure 2B:
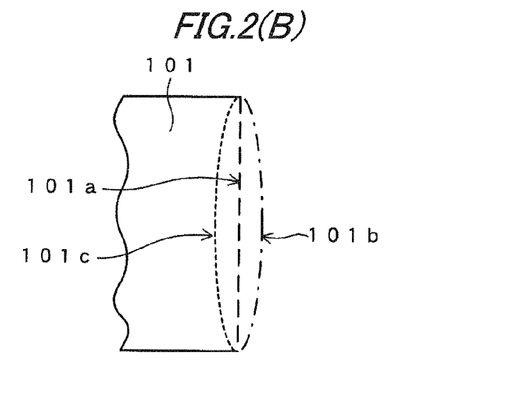

FIG. 2(B) shows the PL surface 101b found by calculation when the mold 101 is expanded. The expansion is mainly constituted of heat expansion, while it includes some other expansion due to the mold fastening force and the like. Also, since the actually occurring expansion is limited by pressure acting between the mutually opposed surfaces, the evaluation of the degree of expansion (rising) is calculated in consideration of the surface pressure acting on between the PL surfaces of the mutually opposed molds 101 and 102. That is, a portion receiving a large surface pressure is treated as a portion having a relatively large PL surface rising, whereas a portion receiving a small surface pressure is treated as a portion having a relatively small PL surface rising.

After the rising 101b of the PL surface is calculated, it is reversed with the PL surface 101a, where no deformation exists, as the center thereof, and the reversed surface 101c is calculated. And, the PL surface is set such that the PL surface in the cold time (that is, a situation where there is no increase in temperature) provides the reversed surface 101c (FIG. 2(C)). That is, while an expansion portion caused by the increased temperature due to the molten bath is previously taken into account, the PL surface is set in the form of a recessed surface. Here, there is calculated the machining amount that is necessary to provide the reversed surface 101c in the form of a recessed surface.

Figure 2C:
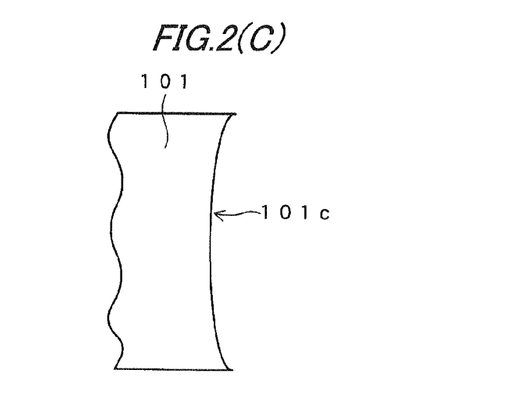
Figure 2D:
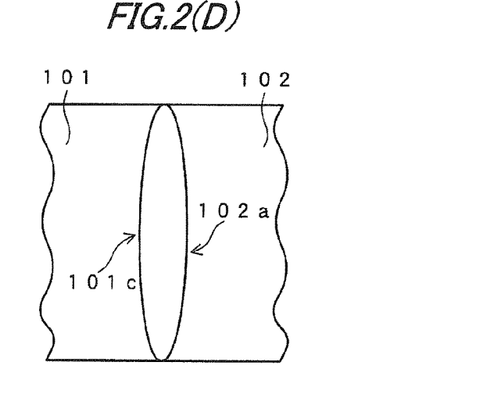
Figure 2F:
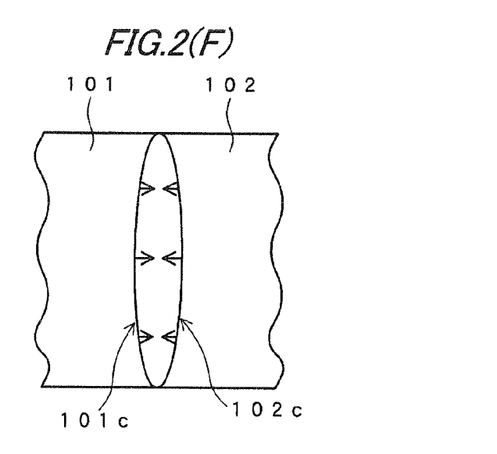
Figure 2G:
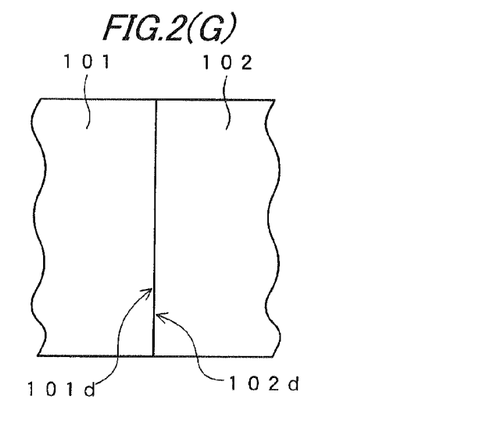

FIG. 2(D) conceptually shows the state of the PL surface in which the molds 101 and 102 are combined together in the state of FIG. 2(C). In the state of FIG. 2(D), the molten bath is charged into a cavity (not shown) for casting. In this case, since the PL surfaces 101c formed as a recessed surface in consideration of its expansion receives heat from the molten bath, it expands in such a manner as conceptually shown in FIG. 2(F); and thus, as shown in FIG. 2(G), there is provided a state in which there is not generated a clearance (or there is reduced the formation of a clearance) between the mutually opposed PL surfaces in the hot time (a state where the temperature becomes high due to the molten bath). In FIG. 2(G), there are shown a PL surface 101d and a PL surface 102d in which the generation of a clearance is prevented. Thus, since the generation of a clearance between the mutually opposed PL surfaces is reduced, the generation of burrs caused due to the clearance between the mutually opposed PL surfaces can be reduced.

(Mold Designing Apparatus)

Figure 3:
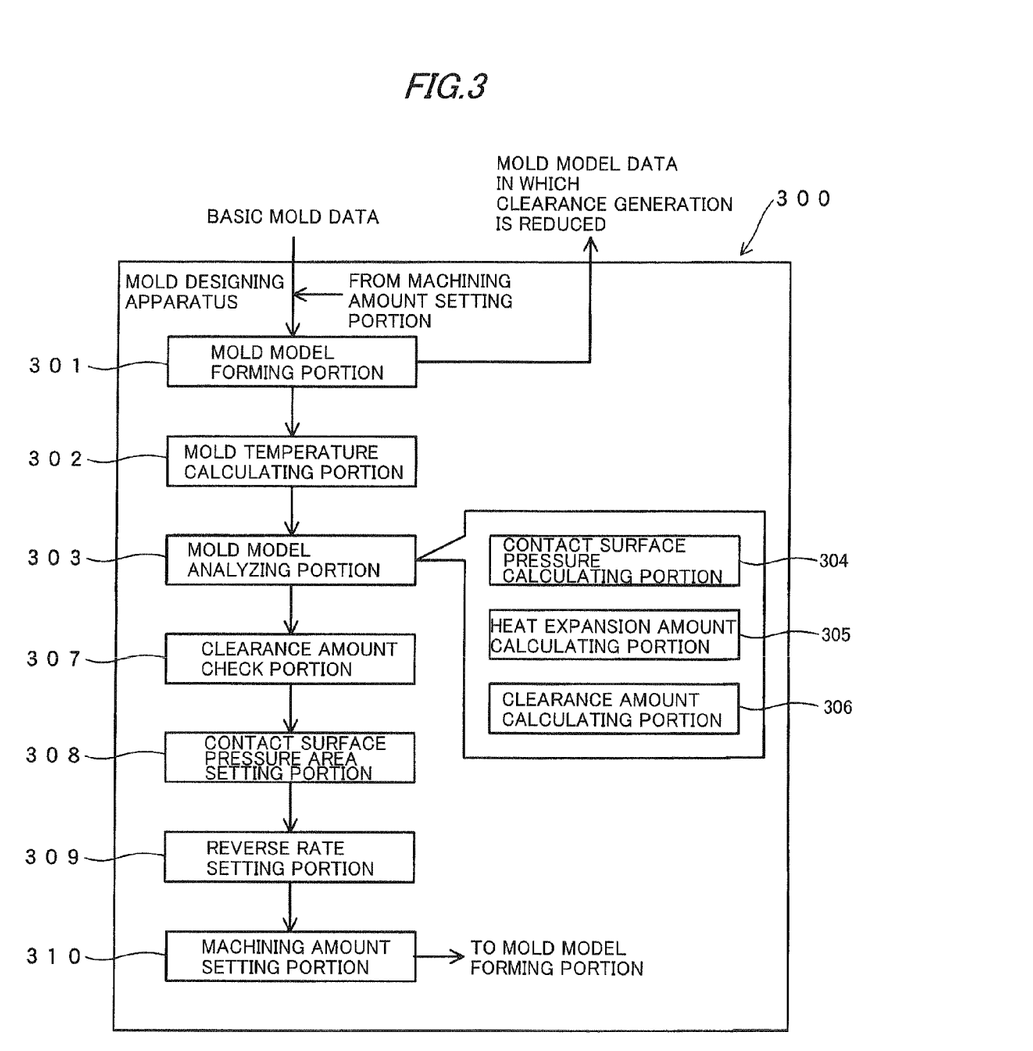
FIG. 3 is a block diagram of an apparatus of an exemplary embodiment.

Now, description will be given below of an example of an apparatus for designing a mold according to the principle shown in FIG. 2. FIG. 3 shows a mold designing apparatus 300 according to the exemplary embodiment. In this embodiment, the mold designing apparatus 300 is structured in the form of software on a computer. A program, which constitutes the metal mode design apparatus 300 and operates it, is installed in the computer. Here, there may also be employed an embodiment in which there is separately prepared a program relating to partial operations, for example, a program relating to three-dimensional CAD software for forming a mold model or a program for heat analysis. Also, there may also be employed an embodiment in which these programs are supplied from the outside through a proper storage medium or a proper line. And, the mold designing apparatus 300 can also be constituted of exclusive hardware which is structured using a PLD (programmable Logic Device) such as an ASIC (Application Specific Integrated Circuit) or an FPGA (Field Programmable Gate Array).

The mold designing apparatus 300 includes a mold model forming portion 301, a mold temperature calculating portion 302, a mold model analyzing portion 303, a clearance amount check portion 307, a contact surface pressure area setting portion 308, a reverse rate setting portion 309 and a machining amount setting portion 310.

The mold model forming portion 301 has a three-dimensional CAD function for carrying out the design of a mold. The mold model forming portion 301 creates the three-dimensional model data of the mold according to mold data serving as basic data.

Also, the mold model forming portion 301, according to the machining amount set by the machining amount setting portion 310, modifies the mold model. The mold temperature calculating portion 302 calculates the temperature distribution of the mold when a molten bath is charged into the mold. This calculation is carried out according to heat simulation software on the market.

The mold model analyzing portion 303 analyzes the influence of heat received from the molten bath on the mold according to simulation. Here, the mold model analyzing portion 303 includes a contact surface pressure calculating portion 304, a heat expansion amount calculating portion 305 and a clearance amount calculating portion 306. The contact surface pressure calculating portion 304 calculates the surface pressure of the mating surfaces of the molds (the mating surfaces when the two molds to be paired are contacted with each other; PL surfaces) when the molds receive heat from the molten bath and the temperatures thereof are thereby raised. This surface pressure is caused mainly by the heat expansion of the molds (although it is also influenced by the pressure of the molten bath) and, according to this surface pressure, the degree of expansion of the PL surface is evaluated. Also, in the case of this surface pressure, the distribution states thereof in the respective portions of the molds are also calculated. The heat expansion amount calculating portion 305 calculates a heat expansion amount on the PL surface. The clearance amount calculating portion 306 calculates the dimension of a clearance generated between the mutually opposed PL surfaces due to expansion of the molds.

The clearance amount check portion 307 checks whether the clearance dimension calculated by the clearance amount calculating portion 306 is equal to or less than a threshold value or not. In this embodiment, for example, as the threshold value, there is set 0.2 mm. Of course, since this threshold value varies depending on the precision, size and material required of a casting, there can also be employed another value.

The contact surface pressure area setting portion 308, according to the distribution state of the contact surface pressures calculated by the contact surface pressure calculating portion 304, divides the areas of the contact surface pressures by certain ranges to thereby set multiple surface pressure areas.

The reverse rate setting portion 309 calculates the reverse rates (for example, the degrees of a reversed shape designated by numeral 101c in FIG. 2(B)) in the respective surface pressure areas set by the contact surface pressure area setting portion 308 according to the surface pressures of such areas. The machining amount setting portion 310 calculates the machining amount (for example, see numeral 109 shown in FIG. 2(C)) of the PL surface according to the heat expansion amount calculated by the mold model analyzing portion 303 and the reverse rate calculated by the reverse rate setting portion 309. According to the thus calculated machining amount, the mold model created by the mold model forming portion 301 is modified. This modification is carried out in the mold model forming portion 301.

(Example of Processings)

Figure 4:
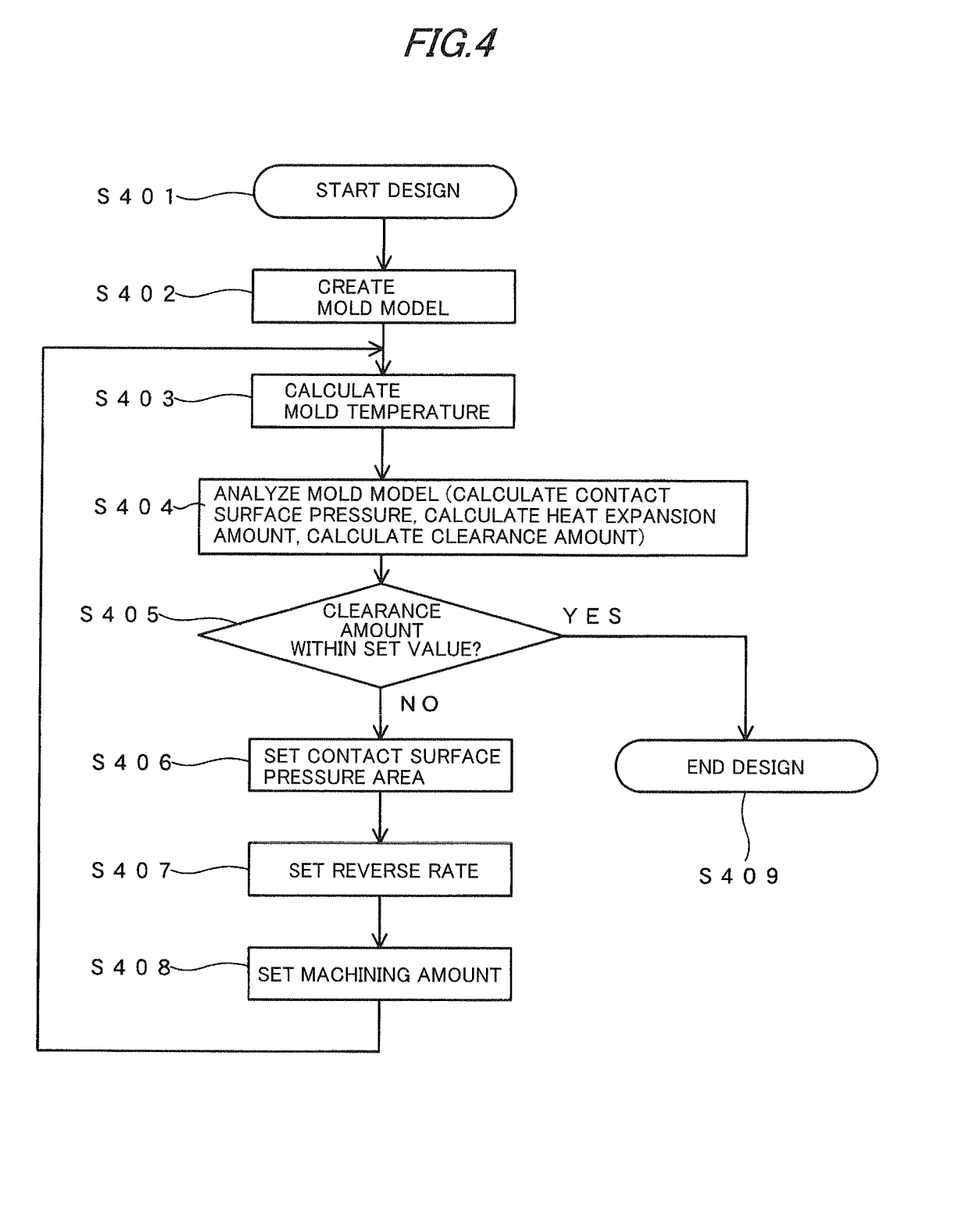
FIG. 4 is a flow chart of a procedure for processings of the exemplary embodiment.

Now, description will be given below of an example of processings to be carried out by the mold designing apparatus 300 shown in FIG. 3. FIG. 4 is a flow chart of an example of processings relating to the design of a mold to be carried out by the metal mode design apparatus 300. When the processing is started (Step S401), the formation of a mold model is carried out by a mold forming portion 301 shown in FIG. 3 (Step S402).

An operation to be carried out in this stage is the same as an operation to create a normal mold model and is carried out using a normal three-dimensional CAD function.

Next, what temperature state the mold model obtained in Step S204 provides under the actual casting conditions is simulated using a computer (Step S403). This processing is carried out by a mold temperature calculating portion 302 shown in FIG. 3 using commercial heat analysis simulation software.

After the temperature of the mold is calculated, according to the calculated temperature, changes generated in the mold due to an increase in the temperature (influences of heat on the mold) are analyzed (Step S404). This processing is also executed using commercial heat analysis simulation software.

This processing is carried out by a mold model analyzing portion 303. In Step S404, there are carried out the calculation of the surface pressure distribution states of the mating surfaces (PL surfaces) of the molds to be paired in the casting time, the calculation of the heat expansion states of the molds in the casting time, and the calculation of the dimension of a clearance generated between the mutually opposed PL surfaces.

Next, the processing advances to Step S405, where it is checked whether the dimension of the clearance between the PL surfaces calculated in Step S404 is equal to or less than a set value (in this case, 0.2 mm) or not (Step S405). This check is made according to the maximum value of the clearance generated. When the clearance amount calculated in Step S404 is equal to or less than the set value, the design of the molds is ended (Step S409). Also, when the clearance amount calculated in Step S404 exceeds the set value, the processing advances to Step S406.

Figure 5:
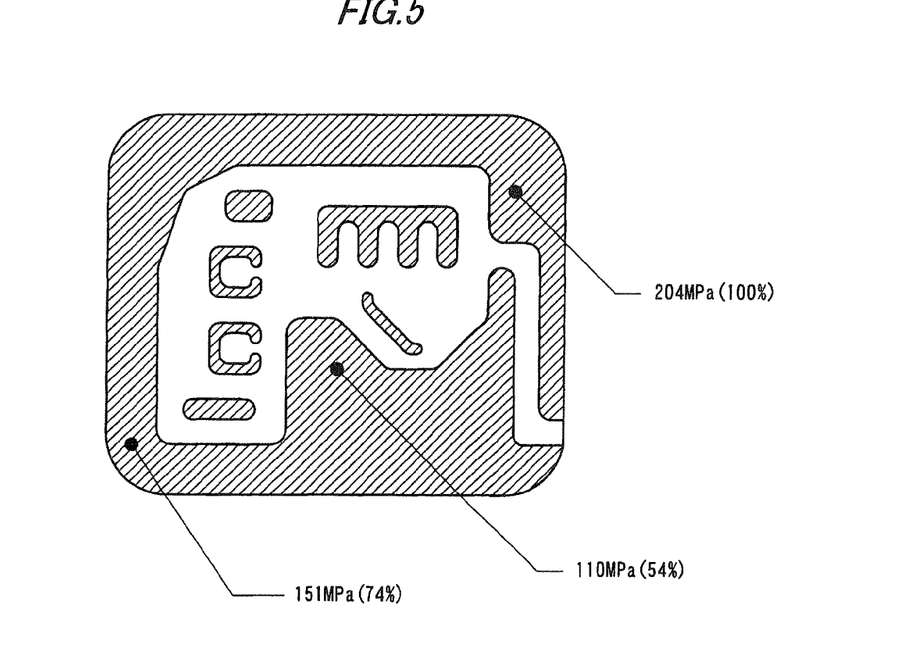
FIG. 5 is a front view of a mold when it is viewed from the PL surface thereof.

In Step S406, according to the distribution state of the contact surface pressures of the PL surfaces calculated in Step S404, the distribution state of the surface pressures is standardized assuming that the maximum value of the contact surface pressure is 100%. This processing is carried out in a contact surface pressure area setting portion 308 shown in FIG. 3. In FIG. 5, there is shown an example of the distribution state of the surface pressures in the PL surface. Also, in FIG. 5, there is shown a state of one of two molds to be paired is viewed from the PL surface side. Here, an oblique line portion shows an area which provides the PL surface. And, as an example, in FIG. 5, there are shown three surface pressures respectively in the three portions of the PL surface calculated by the mold model analyzing portion 303. Also, values shown by % in FIG. 5 respectively express the rates of the surface pressure values (standard values) in the calculation points with respect to the respective maximum values of the surface pressures calculated. Although FIG. 5 shows the surface pressures and their standard values in the three points as an example, actually, in multiple intersection points where, when the PL surface is divided into multiple grids, the grids intersect with each other, there are calculated surface pressures and their respective standard values.

After Step S406, the processing advances to Step S407.

Figure 6:
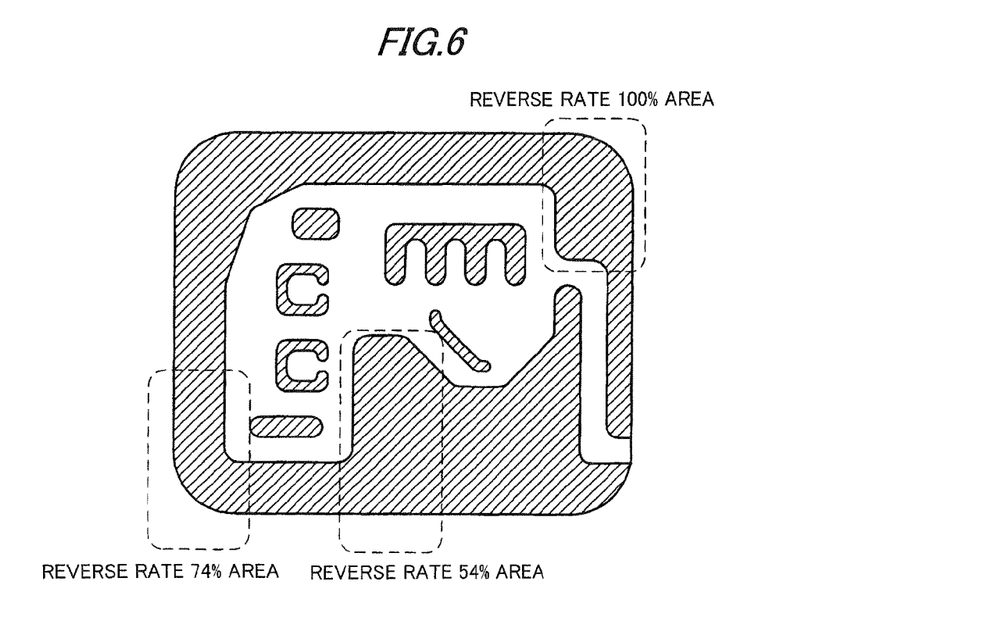
FIG. 6 is a front view of a mold when it is viewed from the PL surface thereof.

In Step S407, according to the distribution state of the standardized contact surface pressures set in Step S406, there are set reverse rates necessary to set the reverse surfaces the principles of which are shown in FIG. 2(B). In this case, while an area the surface pressure of which set in Step S308 is 100% is used as standards, there are set in the respective areas reverse rates which are proportional to the standard values of the surface pressures of these areas. This processing is carried out by a reverse rate setting portion 309 shown in FIG. 3. FIG. 6 shows a specific example of this setting.

In FIG. 6, which corresponds to FIG. 5, the reverse rates are divided into three groups according to differences between the surface pressures and the reverse rates are set according to the rates of the respective areas with respect to the maximum values of the surface pressures.

That is, the reverse rate of the area having a surface pressure of 74% is set for 74% of the reverse rate of the area the surface pressure of which is the maximum pressure. Also, the reverse rate of the area having a surface pressure of 54% is set for 54% of the reverse rate of the area the surface pressure of which is the maximum pressure. The reason for this reverse rate setting will be given below. Firstly, the portion of a large surface pressure is a portion where the mutually pressing forces of the two molds are large. This means that the PL surface of such portion is going to expand (for example, see FIG. 2). Therefore, a portion onto which a relatively large surface pressure is applied is set to have a relatively large reverse rate, and a portion onto which a relatively small surface pressure is applied is set to have a relatively small reverse rate, whereby an action to prevent the generation of a clearance based on the principle illustrated in FIG. 2(F) can be obtained uniformly over the entire portion of the mold.

After Step S407, the processing advances to Step S408.

In Step S408, according to the reverse rate set in Step S407, the machining amount of the mold is set. In this processing, the product of the heat expansion amount calculated in Step S404 and the reverse rate set in Step S407 is calculated as the machining amount. Therefore, even in the case that the heat expansion amounts calculated in Step S404 are the same, a portion having a relatively large surface pressure is machined by a relatively large reverse amount, while a portion having a relatively small surface pressure is machined by a relatively small reverse amount. The processing in Step S408 is carried out by a machining amount setting portion 310 shown in FIG. 3. After Step S408, the processings in Step S403 and in the following steps are carried out again. In this manner, until the clearance between the mutually opposed PL surfaces generated in the casting time (hot time) reaches a set value (in this case, 0.2 mm), the processings in Steps S403~S408 are carried out repeatedly.

(Evaluation)

Figure 7:
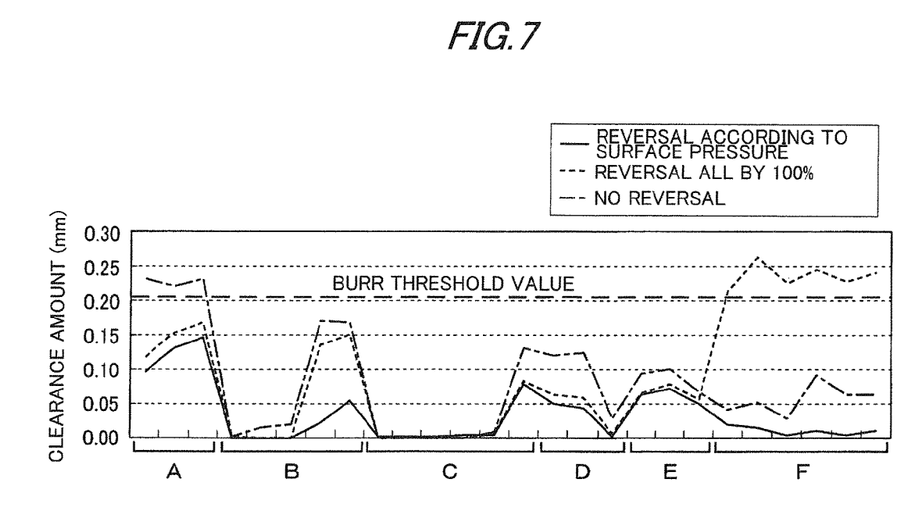
FIG. 7 is a graphical representation of the distribution of clearance amounts.

FIG. 7 shows data on the measured values of the amounts of clearances in the area A, area B, area C, area D, area E and area F of the PL surface. As shown in FIG. 7, in the case that the reverse amount is set according to the surface pressure described in the present embodiment, when compared with a case where no reversal is made, the clearance amount can be reduced greatly. Also, in FIG. 7, there are also shown data obtained when the reverse amounts in the entire areas are set the same according to the surface pressure of the maximum value. In this case, when compared with a case where no measures are taken in the area F (a case where no reversal is made), the clearance amount increases greatly. This shows that, because the machining amount is excessively large with respect to the surface pressure (that is, the area F is excessively machined in a recessed shape), there has been formed a great clearance.

Figure 8:
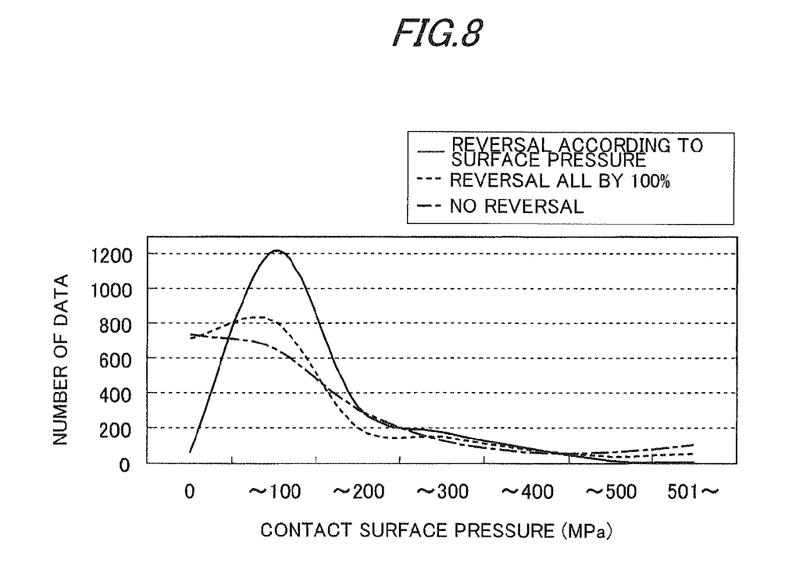
FIG. 8 is a graphical representation of the distribution of contact surface pressures.

FIG. 8 shows data on the plotted values of the contact surface pressures in a case where measuring points are set in a grid manner. As can be seen clearly from FIG. 8, by employing the invention, when compared with a case of "no reversal", there is reduced the number of points having large contact surface pressures. Also, FIG. 8 also shows that portions not in contact (that is, portions the surface pressures of which are 0) are reduced greatly and further the surfaces are uniformly contacted with each other at a value in the vicinity of 100 MPa in the casting time. Further, FIG. 8 shows that, when all areas are reversed by 100%, the number of points short of the surface pressure increases and thus, from the viewpoint of obtaining a uniform contact state, the 100% reversal of all areas provides a low effect.

(Advantages)

Since a reverse surface with its deformation taken into account is set according to the contact surface pressures of the PL surfaces, it is possible to reduce the generation of a clearance between the mutually opposed PL surfaces in the casting time. This can reduce the generation of burrs caused by the generation of the clearance. Also, since the reverse rate of the reverse surface is adjusted according to the distribution of the contact surface pressures, there can be set a reverse surface which corresponds to the degree of deformation, thereby being able to reduce the generation of a new clearance due to excessive reversal. Thus, it is possible to obtain the uniform contact state of two molds in the casting time. Also, since the mating surface is divided into multiple areas according to reverse rates, when compared with a case where a uniform machining amount is set as a whole, the machining amount can be reduced and also the time necessary for machining the molds can be shortened.

Also, since the machining amount of a reversed shape is set with the surface pressure taken into account, it is possible to reduce the occurrence of a phenomenon that a machining amount increases excessively and a new clearance is thereby generated.

Supposing the reverse rate of the reversed surface is not adjusted according to the distribution of the contact surface pressures, for portions where the same heat expansion amounts are calculated, the same machining amount is set regardless of differences between the surface pressures thereof. Here, portions the surface pressures of which are relatively large are portions which have potential ability to thermally expand further; and, portions the surface pressures of which are relatively small are the opposite. Therefore, in two portions having the same heat expansion amount, in the case that the machining amount is set regardless of a difference between their surface pressures, the machining amount of the portion having a relatively small surface pressure is excessively large when compared with the portion having a relatively large surface pressure, leading to the cause of generation of a new clearance.

On the other hand, by setting the machining amount of a shape to be reversed with the surface pressure taken into account, the machining amount of the relatively small surface pressure portion can be prevented from increasing excessively.

(Others)

The setting of the reverse rate may also reflect the parameters of the viscosity and half solidified state of the molten bath. In this case, in the calculation for setting the reverse rate, there is introduced a coefficient expressing the viscosity and half solidified state of the molten bath, and the reverse rate is adjusted using this coefficient. Due to this, into the reverse rate setting calculation, there is employed the influence of the viscosity and half solidified state of the molten bath on the generation of a clearance between the PL surfaces. This makes it possible to design a mold which can further reduce the generation of the clearance.

It is also possible to employ a structure which fulfills the respective functions shown in FIG. 3 separately and carries out the respective processings shown in FIG. 4 separately. For example, the invention can also be carried out using a system in which there are connected multiple computers to the system, the creation of a mold model is carried out using a first computer, the calculation of the temperature of the mold is carried out using a second computer and the like. In this case, the invention can be applied as a mold designing system.

In accordance with the above exemplary embodiment, a mold designing apparatus may include: a calculating portion for calculating the distribution of the contact surface pressures of the mating surfaces of two molds under casting conditions; and, a setting portion for setting the machining amounts of the mating surfaces of the molds according to the distribution of the contact surface pressures.

According to this structure, in order to prevent the generation of a clearance between the mutually opposed PL surfaces of the molds to be paired due to the deformation of the PL surfaces in the casting time, the surface pressures acting on the PL surfaces in the casting time are calculated and, according to the thus calculated surface pressures, the PL surfaces are respectively machined in a recessed shape. Thanks to this, since the recessed shapes are expanded even when the PL surfaces are deformed in the casting time, it is possible to prevent a clearance occurred by turning the PL surfaces into projecting shapes from being generated between the mating surfaces of the molds.

Further, the machining amounts of the molds may be set to be relatively large in an area where the contact surface pressure is relatively large and relatively small in an area where the contact surface pressure is relatively small. According to this structure, the machining amount is set based a difference between the surface pressures. A portion having a large surface pressure shows that the mutually pressing forces of the paired molds are large accordingly. This means that the PL surfaces of such portion are going to expand further.

Therefore, in a portion to which there is applied a relatively large surface pressure, the machining amount of this portion may be set relatively large, whereas in a portion to which there is applied a relatively small surface pressure, the machining amount of this portion may be set relatively small.

Due to this, an action to control the generation of a clearance can be obtained uniformly over the entire portions of the mold.

Further, the machining amounts of the molds may be calculated based on a ratio of the surface pressure in a portion to be machined with respect to a maximum value of the contact surface pressure. According to this structure, since a machining amount reflecting a difference between the surface pressures is set, an action to control the generation of a clearance can be obtained uniformly over the entire portions of the mold.

Further, the mold designing apparatus may further include a heat expansion amount calculating portion for calculating the heat expansion amounts of the mating surfaces of the molds under the casting conditions. The machining amount of the mold may be set based on a heat expansion amount calculated by the heat expansion amount calculating portion and the distribution of the contact surface pressures. According to this structure, since there can be set a machining amount reflecting a difference between the heat expansion states of a portion receiving a large surface pressure and a portion receiving a small surface pressure, there can be solved a problem that the machining amount can be set excessively large.

Moreover, in accordance with the above exemplary embodiment, a mold designing method may include: a calculating step of calculating the distribution of the contact surface pressures of the mating surfaces of two molds under the casting conditions; and, a setting step of setting the machining amounts of the mating surfaces of the molds based on the distribution of the contact surface pressures.

Moreover, in accordance with the above exemplary embodiment, a mold designing system may include: a calculating portion for calculating the distribution of the contact surface pressures of the mating surfaces of two molds under the casting conditions; and, a setting portion for setting the machining amounts of the mating surfaces of the molds based on the distribution of the contact surface pressures.

Moreover, in accordance with the above exemplary embodiment, in a mold designing program readable and executable by a computer, the computer may be operated as a calculating portion for calculating the distribution of the contact surface pressures of the mating surfaces of two molds under the casting conditions and as a setting portion for setting the machining amounts of the mating surfaces of the molds based on the distribution of the contact surface pressures.

According to the exemplary embodiment, it is possible to prevent the generation of burrs caused by the deformation of molds.

The invention can be applied to casting technology.

DESCRIPTION OF REFERENCE NUMERALS AND SIGNS

100: Casting apparatus
101, 102: Molds to be paired
101a, 102a: PL surfaces in cold time
101b, 102b: PL surfaces in hot time
101c, 102c: Reverse surface
101d, 102d: PL surfaces in hot time with deformation of PL surface taken into consideration
103: Movable portion
104: Fixed portion
105, 106: Clearance

What is claimed is:

1. A mold designing apparatus comprising:
    a contacting surface pressure calculating portion adapted to calculate a distribution of a contact surface pressure of a mating surface of a model of a mold under a casting condition;
    a heat expansion amount calculating portion adapted to calculate a heat expansion amount of the mating surface of the model of the mold under the casting condition;
    a setting portion adapted to modify a shape of the mating surface of the model of the mold as an inverted shape based on the calculated distribution of the contact surface pressure and the heat expansion amount,
    wherein the inverted shape of a respective portion of the mating surface is defined as the shape of the respective portion which is inverted with a surface of the respective portion, in which no deformation by heat expansion exists, as an inversion center from the shape of the respective portion in which deformation by heat expansion does exist in response to an inversion rate in the respective portion, and
    wherein the inversion rate in the respective portion is calculated based on a product of the heat expansion amount and the contact surface pressure of the respective portion.

2. The mold designing apparatus according to claim 1, wherein a magnitude of the inversion rate in the respective portion is proportional to the magnitude of a magnitude of the contact surface pressure of the respective portion.

3. The mold designing apparatus of claim 1, wherein the calculating portion is further adapted to calculate a temperature state of the mold under a specific casting condition by a computer simulation.

4. A mold designing system comprising:
    a contact surface pressure calculating portion adapted to calculate a distribution of a contact surface pressure of a mating surface of a model of a mold under a casting condition;
    a heat expansion amount calculating portion adapted to calculate a heat expansion amount of the mating surface of the model of the mold under the casting condition;
    a setting portion adapted to modify a shape of the mating surface of the model of the mold as an inverted shape based on the calculated distribution of the contact surface pressure and the heat expansion amount,
    wherein the inverted shape of a respective portion of the mating surface is defined as the shape of the respective portion which is inverted with a surface of the respective portion, in which no deformation by heat expansion exists, as an inversion center from the shape of the respective portion in which deformation by heat expansion does exist in response to an inversion rate in the respective portion, and
    wherein the inversion rate in the respective portion is calculated based on a product of the heat expansion amount and the contact surface pressure of the respective portion.

5. The mold designing system of claim 4, wherein the calculating portion is further adapted to calculate a temperature state of the mold under a specific casting condition by a computer simulation.

6. A mold designing computer program product, comprising:
    a non-transitory computer-readable medium comprising code readable and executable by a computer for:
        calculating a distribution of a contact surface pressure of a mating surface of a model of a mold under a casting condition;
        calculating a heat expansion amount of the mating surface of the model of the mold under the casting condition;
        modifying a shape of the mating surface of the model of the mold as an inverted shape based on the calculated distribution of the contact surface pressure and the heat expansion amount, wherein the inverted shape of a respective portion of the mating surface is defined as the shape of the respective portion which is inverted with a surface of the respective portion, in which no deformation by heat expansion exists, as an inversion center from the shape of the respective portion in which deformation by heat expansion does exist in response to an inversion rate in the respective portion, and wherein the inversion rate in the respective portion is calculated based on a product of the heat expansion amount and the contact surface pressure of the respective portion.

7. The computer program product of claim 6, further comprising code for:

calculating a temperature state of the mold under a specific casting condition by a computer simulation.

* * * * *